United States Patent [19]

Sugiura et al.

[11] 4,298,271
[45] Nov. 3, 1981

[54] SCANNING AND PROJECTING DEVICE

[75] Inventors: Muneharu Sugiura, Tokyo; Kazuo Minoura, Yokohama; Setsuo Minami, Kawasaki, all of Japan

[73] Assignee: Canon Kabushiki Kaisha, Tokyo, Japan

[21] Appl. No.: 53,777

[22] Filed: Jul. 2, 1979

[30] Foreign Application Priority Data

Jul. 6, 1978 [JP] Japan ............................ 53-82279

[51] Int. Cl.$^3$ ............... G03G 15/28; G03B 27/70; G03B 27/68
[52] U.S. Cl. ............................ 355/8; 355/52; 355/66
[58] Field of Search .......... 350/6.3, 6.5, 6.6, 6.91; 355/55, 56, 67, 49, 52, 51, 57, 60, 66, 8, 11

[56] References Cited

U.S. PATENT DOCUMENTS

| | | | |
|---|---|---|---|
| 3,428,398 | 2/1969 | Gottschalk | 355/52 |
| 3,468,229 | 9/1969 | Bellows | 355/52 X |
| 3,644,037 | 2/1972 | Larraburu | 355/52 |
| 3,709,602 | 1/1973 | Satomi | 355/49 |
| 3,825,339 | 7/1974 | Ogawa | 355/8 X |
| 4,012,142 | 3/1977 | Serikawa | 355/66 |
| 4,092,065 | 5/1978 | Tsuda et al. | 355/8 |

FOREIGN PATENT DOCUMENTS 951128 10/1956 Fed. Rep. of Germany ........ 355/52

*Primary Examiner*—Donald A. Griffin
*Attorney, Agent, or Firm*—Fitzpatrick, Cella, Harper & Scinto

[57] ABSTRACT

A scanning and projecting device of a construction having a rotationally symmetrical first image forming optical system, a scanning surface disposed on the focal plane of the optical system, a deflector to deflect a parallel light beam emitted from the scanning surface and passing through the first image forming optical system, a rotationally symmetrical second image forming system which receives the parallel light beam deflected by the deflector, a light receiving surface disposed at an image forming position of the second image forming optical system, and at least one anamorphic optical system disposed in the light path between the scanning surface and the light receiving surface.

12 Claims, 13 Drawing Figures

(I)-(1)

(I)-(2)

SCANNING AND PROJECTING DEVICE

BACKGROUND OF THE INVENTION

1. Field of the Invention

This invention relates to a scanning and projecting device to form a distortion-free image on a flat surface to be scanned by the use of a light deflector such as a rotary type reflecting mirror like a polygonal mirror, or a rotating-and-vibrating type reflecting mirror like a galvano-mirror (both types of the reflecting mirrors will hereinafter be called generally "rotary reflecting mirror").

2. Description of the Prior Arts

There have so far been proposed various types of devices for projecting an image on a flat surface to be scanned by using a rotary reflecting mirror. As one of image projecting methods for such projecting device, two image forming optical systems are arranged with a rotary reflecting mirror being interposed therebetween, and parallel light beams are scanned by these two image forming optical systems and the rotary reflecting mirror.

FIGS. 1 and 2 of the accompanying drawing illustrate one embodiment of the image projecting device using such scanning system, in which a light beam from a scanning plane 1 is rendered a parallel light beam by a first image forming lens 2, having one of its focal planes on the scanning plane 1, and is deflected by a rotary reflecting mirror 3. This deflected parallel light beam will then be focussed on a focal plane 5 by a second image forming lens 4. Accordingly, a position P on the scanning plane 1, which is to be focussed on a fixed point P' on the plane 5, moves with rotation of the rotary reflecting mirror 3.

In such image projecting optical system, as the scanning position P on the scanning plane 1 changes with rotation of the rotary reflecting mirror 3, there takes place changes in the image forming magnification in both the scanning direction (along the plane of the drawing sheet) and the direction perpendicular to the scanning direction (normal to the drawing sheet). Further, the changes in the image forming magnification differ in the ratio thereof between the scanning direction and the direction orthogonal thereto. On account of this change in the image forming magnification, therefore, the image of the scanning plane 1 to be focussed on the fixed point P' on the focal plane 5 is distorted.

SUMMARY OF THE INVENTION

It is therefore an object of the present invention to provide an image projecting device capable of correcting the image forming magnification which is different in both scanning direction of the light deflector, i.e., the rotary reflecting mirror, and the direction orthogonal to the scanning direction, so that the image forming magnification may be the same in both these directions.

It is another object of the present invention to provide an image projecting device which renders the image forming magnification of the scanning surface to be always constant irrespective of the deflecting angle of the deflector.

It is still another object of the present invention to provide an image projecting device capable of scanning the scanning surface at a constant speed.

It is a further object of the present invention to provide an image projecting device capable of attaining the afore-mentioned various objects with a simple construction.

With a view to attaining the abovementioned objects, the scanning and projecting device according to the present invention is provided with a rotationally symmetrical first image forming optical system, a rotationally symmetrical second image forming optical system, a rotary reflecting mirror as a deflecting and scanning means disposed between the first and second image forming optical systems, and at least one anamorphic optical system. In this construction, a first plane is disposed on one of the focal planes of the first image forming optical system opposite to the rotary reflecting mirror, and a second plane is disposed on the focal plane of the second image forming optical system opposite to the rotary reflecting mirror. This anamorphic optical system is for correcting the image forming magnification which is different in the orthogonal direction, when the first plane is projected onto the second plane, as already mentioned in the foregoing.

According to the present device, the anamorphic optical system and the first or second image forming optical system are cooperatively used, whereby the image forming magnification at the time of projecting the first plane onto the second plane can be maintained constant irrespective of the rotational angle of the rotary reflecting mirror.

In the image projecting device according to the present invention, at least two lenses out of the lens group constituting the rotationally symmetrical first and second image forming optical systems for correcting changes in the image forming magnification are moved in synchronism with the rotational angle of the deflector. Also, in the anamorphic optical system, it is possible that at least one lens out of the lens group constituting the optical system is moved in synchronism with the rotational angle of the deflector, or in the case of providing the anamorphic optical system closer to the side of the first plane than to the side of the deflector, the anamorphic optical system can be constructed with a fixed lens group.

The projecting device according to the present invention can be used not only for reading and recording information on the first plane, but also for writing information into the first plane. For example, it is suited for a recording apparatus of a construction, wherein a fixed slit is provided just in front of the second plane, a photosensitive plane which rotates or merely moves in parallel is provided at the position of the second plane, and then the first plane is scanned in a slit form on the rotary reflecting surface to record information on the photosensitive plane provided on the second plane.

DESCRIPTION OF PREFERRED EMBODIMENTS

Figure 1:
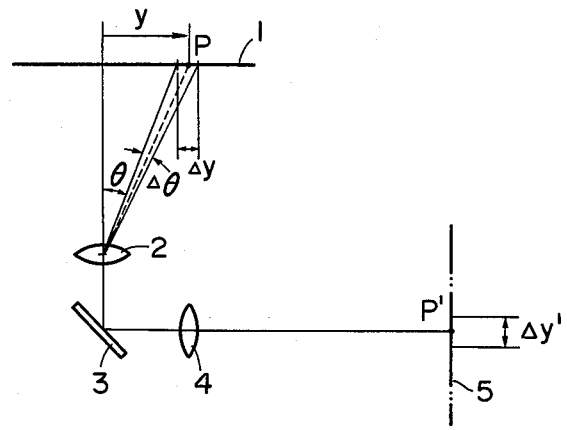
FIGS. 1 and 2 are schematic diagrams showing one embodiment of a conventional projecting device.
Figure 2:
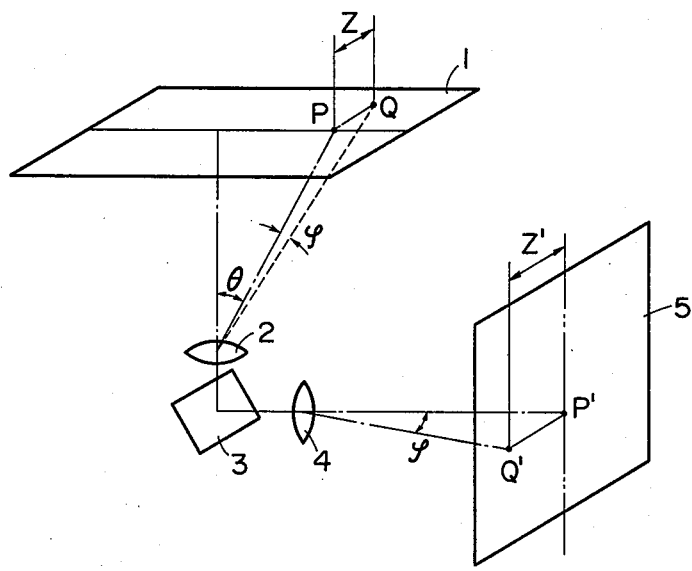

Referring first to FIGS. 1 and 2, detailed explanations will be given as to how the image forming magnification varies between the scanning direction of the rotary reflecting mirror and the direction perpendicular thereto, when the scanning plane is projected by the image projecting device shown in FIG. 1.

As shown in FIG. 1, a point P conjugative with a fixed point P' on the focal plane 5 of the second image forming lens system 4 is on the focal plane 1 of the first image forming lens system 2. The position of the conjugative point P with this fixed point P' moves with rotation of the rotary reflecting mirror 3. In this instance, the following relationship is established, if it is assumed that an angle which a light beam emitting from the point P and being incident on the front main point of the image forming lens system 2 forms with the optical axis of the image forming lens system 2 is $\theta$, and a distance on the focal plane 1 from the optical axis of the first image forming lens system 2 to the point P is y.

$$y = f_2 \tan \theta \tag{1}$$

(where $f_2$ is a focal length of the first image forming lens system 2)

Now assume that an angle to be formed by two light beams which include this point P and emit from both ends of a very small segment of $\Delta y$ in the scanning direction to be incident onto the front main point of the image forming lens system 2 is $\Delta\theta$, the following equation is obtained from the equation (1)

$$\Delta\theta = \frac{\Delta y}{f_2} \cdot \cos^2\theta \tag{2}$$

The two light beams pass through the first image forming lens system 2, are reflected by a mirror 3, and enter into the second image forming lens system 4. The incident angle of the light beams is $\Delta\theta$ same as above.

For the sake of simplicity, it is assumed that the point P' stands for the focus of the second image forming lens system 4. Since the rotary reflecting mirror 3 rotates in such a manner as mentioned above to fix the position of the point P'-a conjugative image of the point P, a length $\Delta y'$ of the conjugative image on the abovementioned focal plane 5 of the very small segment including the point P can be represented as follows.

$$\Delta y' = f_4 \cdot \Delta\theta \tag{3}$$

(where $f_4$ is a focal length of the second image forming lens system) From the equations (2) and (3), the following equation can be obtained.

$$\frac{\Delta y'}{\Delta y} = \frac{f_4}{f_2} \cos^2\theta \tag{4}$$

That is to say, as the point P moves on the focal plane 1 by the scanning, the image forming magnification in the scanning direction near the point P varies.

As for the direction which is perpendicular to the scanning direction, a point Q at a position which is distant by Z from the point P is in a conjugative relationship with a point Q' which is distant by Z' from the point P' on the focal plane 5 formed by the first image forming lens system 2 and the second image forming lens system 4 through the rotary reflecting mirror 3. In this case, if it is assumed that an angle formed by a light beam incident on the front main point of the first image forming lens system 2 from the points P and Q is $\phi$, an angle to be formed by a light beam emitted from the second image forming lens system 4 after it is reflected by the rotary reflecting mirror 3 is also $\phi$, hence the following relationship is established.

$$\begin{pmatrix} Z = \frac{y}{\sin\theta} \cdot \tan\phi = \frac{f_2}{\cos\theta} \cdot \tan\phi \\ Z' = f_4 \tan\phi \\ \therefore \frac{Z'}{Z} = \frac{f_4}{f_2} \cos\theta \end{pmatrix} \tag{5}$$

In other words, as the scanning position changes by the scanning, the image forming magnification in the direction perpendicular to the scanning direction also changes. Therefore, the image forming magnification in the scanning direction varies in proportion to $\cos^2\theta$, while the image forming magnification in the direction perpendicular to the scanning direction varies in proportion to $\cos\theta$.

Figure 3:
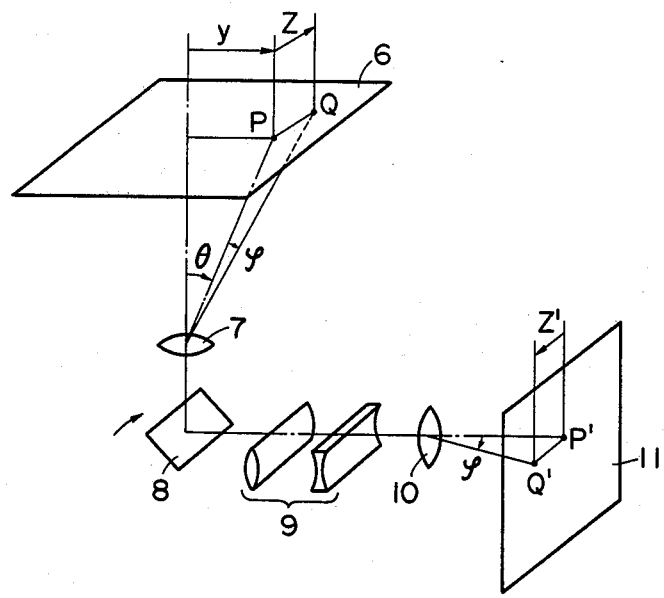
FIGS. 3 and 4 are schematic diagrams showing one embodiment of the projecting device according to the present invention.
Figure 4:
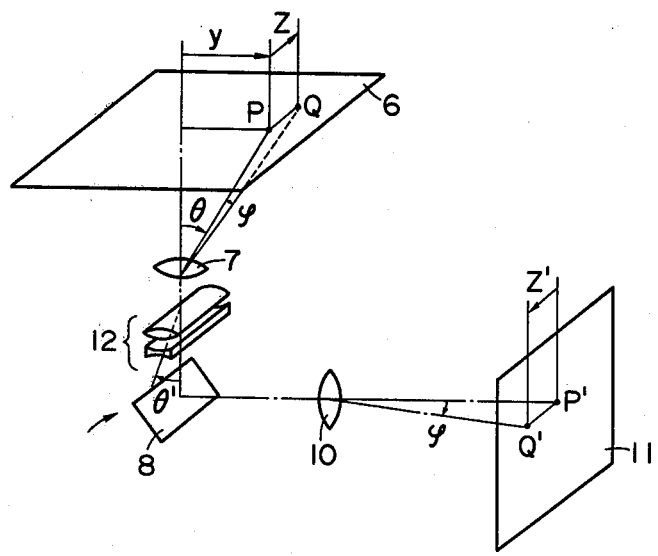

FIGS. 3 and 4 illustrate preferred embodiments of the projecting device according to the present invention, in which the same component elements as those in FIGS. 1 and 2 are designated by the same reference numerals and symbols.

In FIGS. 3 and 4, any one of the first image forming lens group 7 or the second image forming lens group 10 is a rotationally symmetrical type variable magnification lens group, the image magnification of which is varied by moving at least two lenses out of various lenses constituting the lens group in accordance with rotation of the rotary reflecting mirror 8. When the first image forming lens group 7 is the variable magnification lens group, the plane 6 is always on the focal plane of the first image forming lens group, even when the image forming magnification of the lens group 7 varies. On the other hand, when the second image forming lens group 10 is the variable magnification lens group, the plane 11 is always on the focal plane of the second image forming lens group 10. A reference numeral 9 designates an anamorphic variable magnification lens group, in which at least two lenses out of the lenses constituting the lens group move to vary the image forming magnification in one direction. In FIG. 3, the anamorphic variable magnification lens group 9 is interposed between the rotary reflecting mirror 8 and the second image forming lens group 10, although the lens group 9 may be disposed at any position between the focal plane 6 and the focal plane 11. Also, when the anamorphic optical system is disposed at a position closer to the focal plane 6 than to the rotary reflecting mirror 8, it is possible that the anamorphic optical system is constructed with a fixed lens group which generates distortion in one direction alone, as shown in FIG. 4. In this case, the anamorphic optical system may be disposed at any position between the focal plane 6 and the rotary reflecting mirror 8. In such lens construction, when the magnification $\beta Y$ in the rotational direction and the magnification $\beta Z$ in the direction perpendicular to the rotational direction are set to satisfy the following equation by an actual device to be described hereinbelow, formation of a distortion-free image can be attained.

$$\beta Y = \frac{\Delta y'}{\Delta y} = k \, (= \text{constant})$$
$$\beta Z = \frac{Z'}{Z} = k \, (= \text{constant})$$
(6)

The practical formation of the distortion-free image will now be explained in reference to concrete image projecting devices according to the present invention. In the first case, the anamorphic variable magnification lens group 9 is interposed between the rotary reflecting mirror 8 and the second image forming lens group 10, and the second image forming lens group 10 is the variable magnification lens group, as shown in FIG. 3. In the second case, the fixed anamorphic lens group 12 is interposed between the first image forming lens group 7 and the rotary polygonal mirror 8, and the second image forming lens group 10 is the variable magnification lens group, as shown in FIG. 4.

First of all, the first case, wherein the lens group 10 consists of the rotationally symmetrical type variable magnification lens group, and the anamorphic variable magnification lens group 9 is interposed between the rotary reflecting mirror 8 and the lens group 10, will be explained.

In this first case, the anamorphic variable magnification lens group 9 is always afocal, and the lens group 9 has its magnification changing effect either within a plane parallel to the rotational direction of the rotary reflecting mirror 8, or within a plane perpendicular to the rotational direction of the rotary reflecting mirror 8. In the former case, i.e., in case the anamorphic variable magnification lens group 9 has its magnification changing effect within the plane parallel to the rotational direction of the rotary reflecting mirror, the above equation (6) can be satisfied by fulfilling the condition represented by the following equation (7).

$$m = m_C = \frac{1}{\cos\theta}$$
(7)

(where: $m_C$ is a magnification ratio of the anamorphic variable magnification lens group 9) In other words, when a focal length of the lens group 7 is $f_7$, and a focal length of the variable magnification lens group 10 is $f_{10}$, when $\theta = 0$, the following relationships are established:

$$\Delta y = \frac{f_7}{\cos^2\theta} \cdot \Delta\theta$$

$$\Delta y' = f_{10} \cdot m \cdot m_C \cdot \Delta\theta = \frac{f_{10}}{\cos^2\theta} \cdot \Delta\theta$$

$$Z = \frac{f_7}{\cos\theta} \cdot \tan\phi$$

$$Z' = f_{10} \cdot m \cdot \Delta\theta = \frac{f_{10}}{\cos\theta} \cdot \Delta\theta$$

Hence, $\beta Y = \beta Z = f_{10}/f_7 (=\text{constant})$.

It should be noted here that, by varying the focal length in either one of the rotationally symmetrical type lens groups 7 and 10, an arbitrary magnification in reproduction can be obtained. For instance, the focal length can be changed by either replacing the rotationally symmetrical type lens group 7 with a lens group of different focal length, or by moving a lens within the lens group 7.

Next, in the latter case, i.e., in case the anamorphic variable magnification lens group 9 has its magnification changing effect within a plane perpendicular to the rotational direction of the rotary reflecting mirror, the above equation (6) can be satisfied by fulfilling the condition represented by the following equation (8).

$$\begin{cases} m = \frac{1}{\cos^2\theta} \\ m_C = \cos\theta \end{cases}$$
(8)

In other words, the following relationships are established:

$$\begin{cases} \Delta y = \frac{f_7}{\cos^2\theta} \Delta\theta \\ \Delta y' = f_{10} \cdot m \cdot \Delta\theta \\ \phantom{\Delta y'} = \frac{f_{10}}{\cos^2\theta} \cdot \Delta\theta \end{cases}$$

$$\begin{cases} Z = \frac{f_7}{\cos\theta} \tan\phi \\ Z' = f_{10} \cdot m \cdot m_C \tan\phi \\ \phantom{Z'} = \frac{f_{10}}{\cos\theta} \cdot \tan\phi \end{cases}$$

Hence, $\beta Y = \beta Z = f_{10}/f_7 (=\text{constant})$. In this case, by changing the focal length in either of the rotationally symmetrical type lens groups, same as in the abovementioned first case, the magnification in reproduction can be varied.

It should be noted that, even when the anamorphic varaible magnification lens group 9 possesses its magnification changing effect in the rotational direction of the rotary reflecting mirror, or in the direction perpendicular to the rotational direction, the abovementioned relationship can be satisfied irrespective of the position of the lens group 9 between the rotationally symmetrical lens group 10 and the focal plane 11. Although, in this case, the lens group 7 and the lens group 10 maintain therebetween the afocal state, the anamorphic variable magnification lens group 9 is not required to be an afocal anamorphic lens group.

In the following, the second case, wherein the anamorphic lens group 12, which generates distortion in the rotational direction of the rotary reflecting mirror or only in the direction perpendicular to the rotational direction, is interposed between the lens group 7 and the rotary reflecting mirror 8, will be explained. Particularly, the explanation will be directed to the anamorphic lens group 12 generating the distortion only in the rotational direction of the rotary reflecting mirror 8.

In FIG. 4, it is assumed that an angle, which a light beam emitting from the point P distance by y from the optical axis on the focal plane 6 of the first image forming lens group 7 and entering into the front main point on the near axis of the lens group 7 forms with the optical axis, is $\theta$, and an angle, which this light beam forms with the optical axis when it emits from the anamorphic lens group 12, is $\theta'$, and these angles $\theta$ and $\theta'$ are made to satisfy the following relationship.

$$\theta' = \log e \left| \tan\left(\frac{\theta}{2} + \frac{\pi}{4}\right) \right| \quad (9)$$

In this case, the magnification changing ratio m of the rotationally symmetrical type variable magnification lens group 10 is represented as:

$$m = 1/\cos\theta \quad (10)$$

When the above equations (9) and (10) are established, the equation (6) is satisfied. In other words, from the equation (9), the following result will be obtained.

$$\Delta\theta' = \frac{1}{\cos\theta} \cdot \Delta\theta$$

Using the above result and the equation (10), the following relationship is established:

$$\begin{cases} \Delta_y = \frac{f_7}{\cos\theta} \cdot \Delta\theta \\ \Delta_{y'} = f_{10} \cdot m \cdot \Delta\theta' \\ \quad = \frac{f_{10}}{\cos^2\theta} \cdot \Delta\theta \end{cases}$$

$$\begin{cases} Z = \frac{f_7}{\cos\theta} \cdot \tan\phi \\ Z' = f_{10} \cdot m \cdot \tan\phi \\ \quad = \frac{f_{10}}{\cos\theta} \cdot \tan\phi \end{cases}$$

Hence, $\beta Y = \beta Z = f_{10}/f_7$ (= constant). Here, $f_7$ is the focal length of the rotationally symmetrical lens group 7 as well as the focal length of a composite system of the rotationally symmetrical lens group 7 and the anamorphic lens group 12. In other words, the anamorphic lens group 12 is an afocal system with its angular magnification of 1 in the near axis region. In addition, $f_{10}$ is the focal length of the variable magnification lens group, when $\theta = 0$. It should be noted here that, by replacing the rotationally symmetrical lens group 7 or the rotationally symmetrical lens group 10 with other lens groups of different focal length or moving any of the lenses in the lens group, the focal length may be varied and the reproduction magnification can be varied as in the case of the above first case.

Based on such actual device construction as mentioned above, there can be obtained the distortion-free image as intended by the present invention.

In the following, a preferred embodiment of the scanning and projecting device according to the present invention will be described, in which the rear side rotationally symmetrical type lens group (the lens group 10) is constructed with a variable magnification lens group, and the front side rotationally symmetrical type lens group (the lens group 7) is constructed with a fixed lens group.

The name given to each of the lens groups in FIGS. 5 to 8 is as follows.

| | |
|---|---|
| L | front side rotationally symmetrical type fixed lens group |
| u | the first moving lens group in the rear side rotationally symmetrical type variable magnification lens group |
| v | the second moving lens group in the rear side rotationally symmetrical type variable magnification lens group |
| Lc | fixed anamorphic lens group in the anamorphic, variable magnification lens group |
| uC | the first moving anamorphic lens group in the anamorphic, variable magnification lens group |
| vC | the second moving anamorphic lens group in the anamorphic, variable magnification lens group |

Figure 5:
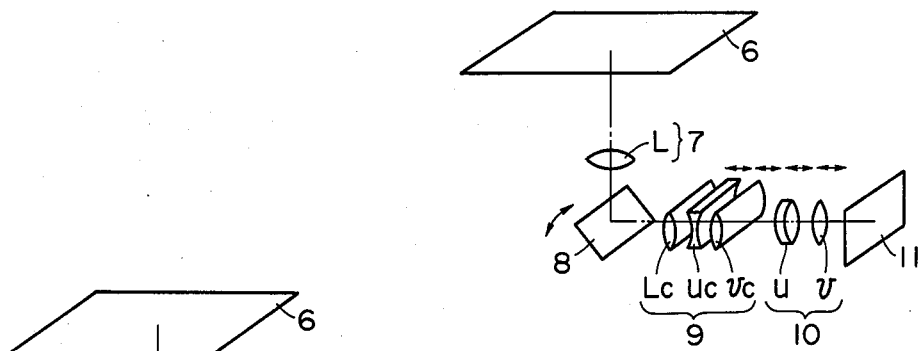
FIGS. 5, 6, 7 and 8 respectively illustrate examples of variable magnification lens groups for the projecting device according to the present invention.

(I) In the case of $m = mC = 1/\cos\theta$ (vide equation (7)):

(1) A power arrangement where the anamorphic, variable magnification lens group is disposed at the afocal section between the rotary reflecting mirror and the rear side rotationally symmetrical type variable magnification lens group (FIG. 5)

| Lens No. (from side of focal plane 6) | Power (1/f) | Main Point Interval | Name of Lens |
|---|---|---|---|
| 1 | 0.00285714 | 70 | L |
| 2 | 0.005 | 20 | Lc |
| 3 | −0.01111111 | 20 | uC |
| 4 | 0.005 | 30 | vC |
| 5 | −0.004 | 40 | u |
| 6 | 0.00591133 | | v |

The distance from the surface of the image original to the main point of the first lens group (the front side rotationally symmetrical type fixed lens group) is 350 mm which is the focal length of the first lens group.

Figure 9:
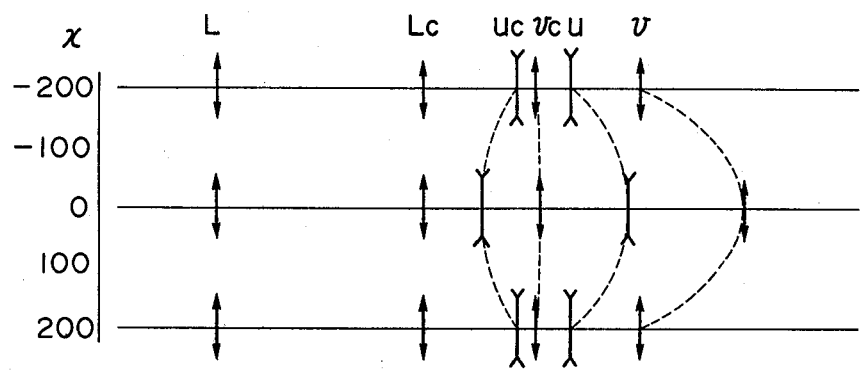
FIG. 9 is a diagram showing a locus of motion of the variable magnification lens group shown in FIG. 5.

The moving quantity of the moving lens group and the magnification changing effect by the moving lens group in the above-mentioned power arrangement will be shown in Table 1 below, and its moving relationship is diagrammed in FIG. 9.

Figure 6:
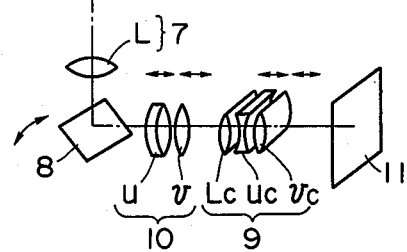

(2) A power arrangement where the anamorphic, variable magnification lens group is disposed between the rear side rotationally symmetrical type variable magnification lens group and the image forming plane (FIG. 6)

| Lens No. (from side of focal plane 6) | Power (1/f) | Main Point Interval | Name of Lens |
|---|---|---|---|
| 1 | 0.00285714 | 100 | L |
| 2 | −0.004 | 40 | u |
| 3 | 0.00591133 | 20 | v |
| 4 | 0.01186721 | 20 | Lc |
| 5 | −0.03338914 | 20 | uC |
| 6 | 0.01323914 | | vC |

The distance from the surface of the image original to the main point of the first lens group (the front side rotationally symmetrical type fixed lens group) is 350 mm which is the focal length of the first lens group.

Figure 10:
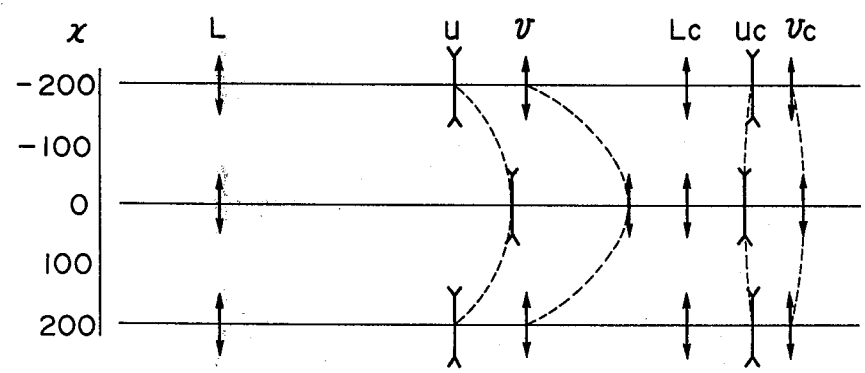
FIG. 10 is a diagram showing a locus of motion of the variable magnification lens group shown in FIG. 6.

The moving quantity of the moving lens group and the magnification changing effect by the moving lens groups in the abovementioned power arrangement will be shown in Table 2 below, and its moving relationship is diagrammed in FIG. 10.

Figure 7:
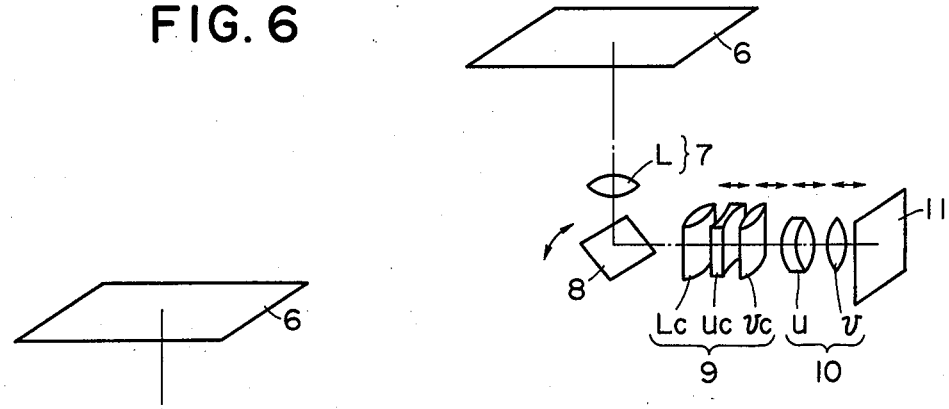

(II) In the case of $m = 1/\cos^2 \theta$, $m_c = \cos \theta$ (vide equation (8)):

(1) A power arrangement where the anamorphic variable magnification lens group is disposed at the afocal section between the rotary reflecting mirror and the rear side rotationally symmetrical type variable magnification lens group (FIG. 7)

| Lens No. (from side of focal plane 6) | Power (1/f) | Main Point Interval | Name of Lens |
|---|---|---|---|
| 1 | 0.00285714 | 70 | L |
| 2 | 0.005 | 20 | Lc |
| 3 | −0.01111111 | 20 | uC |
| 4 | 0.005 | 30 | vC |
| 5 | −0.003 | 50 | u |
| 6 | 0.00509317 |  | v |

The distance from the surface of the image original to the main point of the first lens group (the front side rotationally symmetrical type fixed lens group) is 350 mm which is the focal length of the first lens group.

Figure 11:
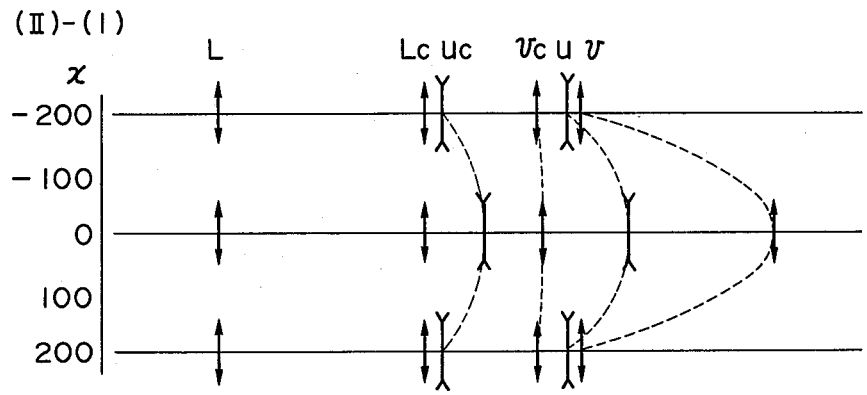
FIG. 11 is a diagram showing a locus of motion of the variable magnification lens group shown in FIG. 7.

The moving quantity of the moving lens group and the magnification changing effect by the moving lens groups in the abovementioned power arrangement will be shown in Table 3 below, and its moving relationship is diagrammed in FIG. 11.

Figure 8:
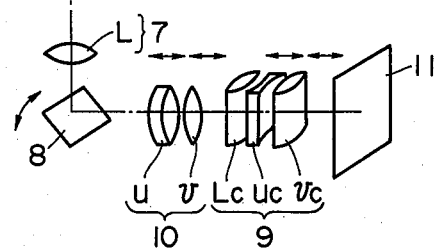

(2) A power arrangement where the anamorphic, variable magnification lens group is interposed between the rear side rotationally symmetrical type variable magnification lens group and the image forming plane (FIG. 8)

| Lens No. (from side of focal plane 6) | Power (1/f) | Main Point Interval | Name of Lens |
|---|---|---|---|
| 1 | 0.00285714 | 100 | L |
| 2 | −0.003 | 50 | u |
| 3 | 0.00509317 | 20 | v |
| 4 | 0.01169067 | 20 | Lc |
| 5 | −0.03275160 | 20 | uC |
| 6 | 0.01305600 |  | vC |

The distance from the surface of the image original to the main point of the first lens group (the front side rotationally symmetrical type fixed lens group) is 350 mm which is the focal length of the first lens group.

Figure 12:
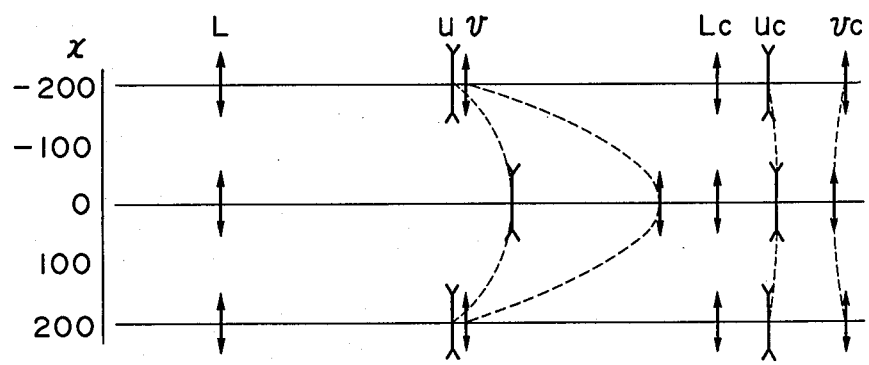
FIG. 12 is a diagram showing a locus of motion of the variable magnification lens group shown in FIG. 8.

The moving quantity of the moving lens group and the magnification changing effect by the moving lens group in the abovementioned power arrangement will be shown in Table 4 below, and its moving relationship is diagrammed in FIG. 12.

(I) In the case of $m = 1/\cos^2 \theta$ and $m_c = 1/\cos \theta$:

TABLE 1

(1) Moving quantity when the anamorphic, variable magnification lens group is disposed at the afocal section between the rotary mirror and the rear side rotationally symmetrical type variable magnification lens group:

| Y (mm) | δ (°) | θ (°) | $u_c$ (mm) | $v_c$ (mm) | u (mm) | v (mm) | $m_c$ | mm | b.f. (mm) |
|---|---|---|---|---|---|---|---|---|---|
| −200. | −14.872 | −29.744 | 11.858 | −1.800 | −20.019 | −35.940 | 1.152 | −1.152 | 441.941 |
| −150. | −11.599 | −23.198 | 7.277 | −0.640 | −11.063 | −20.834 | 1.088 | −1.088 | 426.834 |
| −100. | −7.973 | −15.946 | 3.463 | −0.139 | −4.828 | −9.477 | 1.040 | −1.040 | 415.478 |
| −50. | −4.065 | −8.130 | 0.905 | −0.009 | −1.190 | −2.404 | 1.010 | −1.010 | 408.405 |
| 0. | 0. | 0. | 0. | 0. | 0. | 0. | 1. | −1. | 406.001 |
| 50. | 4.065 | 8.130 | 0.905 | −0.009 | −1.190 | −2.404 | 1.010 | −1.010 | 408.405 |
| 100. | 7.973 | 15.946 | 3.463 | −0.139 | −4.828 | −9.477 | 1.040 | −1.040 | 415.478 |
| 150. | 11.599 | 23.198 | 7.277 | −0.640 | −11.063 | −20.834 | 1.088 | −1.088 | 426.834 |
| 200. | 14.872 | 29.744 | 11.858 | −1.800 | −20.019 | −35.940 | 1.152 | −1.152 | 441.941 |

TABLE 2

(2) Moving quantity when the anamorphic, variable magnification lens group is interposed between the rear side rotationally symmetrical type variable magnification lens group and the image forming plane.

| Y | δ | θ | u | v | $u_c$ | $v_c$ | m | $m_c$ | b.f. |
|---|---|---|---|---|---|---|---|---|---|
| −200. | −14.872 | −29.744 | −20.019 | −35.940 | 2.266 | −4.305 | −1.152 | 1.152 | 350.306 |
| −150. | −11.599 | −23.198 | −11.063 | −20.834 | 1.394 | −2.446 | −1.088 | 1.088 | 348.447 |
| −100. | −7.973 | −15.946 | −4.828 | −9.477 | 0.664 | −1.093 | −1.040 | 1.040 | 347.093 |
| −50. | −4.065 | −8.130 | −1.190 | −2.404 | 0.174 | −0.274 | −1.010 | 1.010 | 346.274 |
| 0. | 0. | 0. | 0. | 0. | 0. | 0. | −1. | 1. | 346.001 |
| 50. | 4.065 | −8.130 | −1.190 | −2.404 | 0.174 | −0.274 | −1.010 | 1.010 | 346.274 |
| 100. | 7.973 | −15.946 | −4.828 | −9.477 | 0.664 | −1.093 | −1.040 | 1.040 | 347.093 |
| 150. | 11.599 | −23.198 | −11.063 | −20.834 | 1.394 | −2.446 | −1.088 | 1.088 | 348.447 |
| 200. | 14.822 | −29.744 | −20.019 | −35.940 | 2.266 | −4.305 | −1.152 | 1.152 | 350.306 |

(NOTE)
Y scanning length on the surface of an image original;
δ rotational angle of rotary mirror;
θ deflecting angle;
u, v moving quantity of rotationally symmetrical type lens group;
$u_c$, $v_c$ moving quantity of anamorphic moving lens group;
m magnification by rotationally symmetrical type lens group;
$m_c$ magnification by anamorphic lens group;
b.f. back focus.

(II) In the case of $m = 1/\cos^2 \theta$ and $m_c = 1/\cos \theta$:

TABLE 3

(1) Moving quantity when the anamorphic, variable magnification lens group is disposed at the afocal section between the rotary mirror and the rear side rotationally symmetrical type variable magnification lens group:

| Y (mm) | δ (°) | θ (°) | $u_c$ (mm) | $v_c$ (mm) | u | v | $m_c$ | m | b. f. |
|---|---|---|---|---|---|---|---|---|---|
| −200. | −14.872 | −29.744 | −13.658 | −1.799 | −21.288 | −67.317 | 0.868 | −1.327 | 469.817 |
| −150. | −11.599 | −23.198 | −7.917 | −0.640 | −8.850 | −37.866 | 0.919 | −1.183 | 440.366 |
| −100. | −7.973 | −15.946 | −3.601 | −0.139 | −2.717 | −16.829 | 0.962 | −1.082 | 419.330 |
| −50. | −4.065 | −8.130 | −0.914 | −0.009 | −0.467 | −4.207 | 0.990 | −1.020 | 406.708 |
| 0. | 0. | 0. | 0. | 0. | 0. | 0. | 1. | −1. | 402.500 |
| 50. | 4.065 | 8.130 | −0.914 | −0.009 | −0.467 | −4.207 | 0.990 | −1.020 | 406.708 |
| 100. | 7.973 | 15.946 | −3.601 | −0.139 | −2.717 | −16.829 | 0.962 | −1.082 | 419.330 |
| −150. | 11.599 | 23.198 | −7.917 | −0.640 | −8.850 | −37.866 | 0.919 | −1.183 | 440.366 |
| −200. | 14.872 | 29.744 | −13.658 | −1.799 | −21.288 | −67.317 | 0.868 | −1.327 | 469.817 |

TABLE 4

(2) Moving quantity when the anamorphic, variable magnification lens group is interposed between the rear side rotationally symmetrical type variable magnification lens group and the image forming plane:

| Y | δ | θ | u | v | $u_c$ | $v_c$ | m | $m_c$ | b.f. |
|---|---|---|---|---|---|---|---|---|---|
| −200. | −14.872 | −29.744 | −21.288 | −67.317 | −2.652 | 3.431 | −1.327 | 0.868 | 339.069 |
| −150. | −11.599 | −23.198 | −8.850 | −37.866 | −1.532 | 2.176 | −1.183 | 0.919 | 340.324 |
| −100. | −7.973 | −15.946 | −2.717 | −16.829 | −0.695 | 1.060 | −1.082 | 0.962 | 341.440 |
| −50. | −4.065 | −8.130 | −0.467 | −4.207 | −0.176 | 0.281 | −1.202 | 0.990 | 342.219 |
| 0. | 0. | 0. | 0. | 0. | 0. | 0. | −1. | 1. | 342.500 |
| 50. | 4.065 | 8.130 | −0.467 | −4.207 | −0.176 | 0.281 | −1.020 | 0.990 | 342.219 |
| 100. | 7.973 | 15.946 | −2.717 | −16.829 | −0.695 | 1.060 | −1.082 | 0.962 | 341.440 |
| 150. | 11.599 | 23.198 | −8.850 | −37.866 | −1.532 | 2.176 | −1.183 | 0.919 | 340.324 |
| 200. | 14.872 | 29.744 | −21.288 | −67.317 | −2.652 | 3.431 | −1.327 | 0.868 | 339.069 |

(NOTE)
Y scanning length on the surface of an image original;
δ rotational angle of rotary mirror;
θ deflecting angle;
u, v moving quantity of rotationally symmetrical type lens group;
$u_c$, $v_c$ moving quantity of anamorphic moving lens group;
m magnification by rotationally symmetrical type lens group;
$m_c$ magnification by anamorphic lens group;
b.f. back focus.

Next, explanations will be given as to the rotational characteristic of the rotary reflecting mirror 8 when, for example, the scanning speed at the point P in FIG. 4 is to be made constant.

First of all, as shown in FIG. 3, when the anamorphic variable magnification lens group 9 is interposed between the rotary reflecting mirror 8 and the variable magnification lens group 10, the following relationship is established.

$$y = f_7 \cdot \tan\theta \tag{11}$$

Therefore, if the constant speed at the point P is c, it can be represented as follows, provided that, when y=0, a time t is zero (t=0).

$$y = ct \tag{12}$$

Accordingly, from the equations (11) and (12), $$\theta = \tan^{-1}\left(\frac{c}{f_7} \cdot t\right) \tag{13}$$

Hence, the rotational angle φ of the rotary reflecting mirror 8 can be represented as follows.

$$\phi = \frac{\theta}{2} = \frac{1}{2}\tan^{-1}\left(\frac{c}{f_7} \cdot t\right) \tag{14}$$

(where: φ=0, when t=0)

In the second place, as shown in FIG. 4, when the anamorphic lens group 12 which generates distortion as represented by the equation (9) is interposed between the first image forming lens group 7 and the rotary reflecting mirror 8, and the lens group 10 is constructed with the variable magnification lens group, the rotational angle φ of the rotary mirror can be represented as follows, using the equations (9) and (13).

$$\phi = \frac{\theta'}{2} = \frac{1}{2}\log e \left| \tan\left\{\frac{1}{2}\tan^{-1}\left(\frac{c}{f_7} \cdot t\right) + \frac{\pi}{4}\right\} \right| \tag{15}$$

The distortional characteristic of the abovementioned anamorphic lens group 12 is represented by the equation (9), and a value of the distortion coefficient will be clarified in the following.

In general, the distortion can be defined as follows.

$$Dist = \frac{\tan\theta' - \tan\theta}{\tan\theta} \times 100 \, (\%) \tag{16}$$

On the other hand, from the aberration theory (vide: "Lens Design" by Yoshiya Matsui published by Kyoritsu Shuppan K. K., particularly the equation (4.22)), the following equation is given.

$$Dist(\%) = -50\left\{ V(\tan\theta)^2 + \frac{\hat{V}}{4}(\tan\theta)^4 \right\} \quad (17)$$

(where: $V$ and $\hat{V}$ are respectively the third order and fifth order aberration coefficients.) Using the equation (9), $\tan\theta'$ is series-expanded in the region of the fifth order aberration coefficient, and $\tan\theta$ is also series-expanded in the same manner, whereby the following results are obtained from the equations (16) and (17).

$$V = 2\left(\tfrac{1}{3} - C_3\right)$$

$$\hat{V} = 8\left(C_3 - C_5 - \tfrac{1}{5}\right)$$

(where: $C_3$ and $C_5$ are respectively coefficients at the third and fifth terms when $\tan\theta'$ is expanded in the following manner.)

$$\tan\theta' = \theta + C_3\theta^3 + C_5\theta^5 + \ldots$$

Here, since $C_3 = \tfrac{1}{2}$, $C_5 = 1/120$, $\hat{V} = -\tfrac{1}{3}$, $V = 7/3$.

Figure 13:
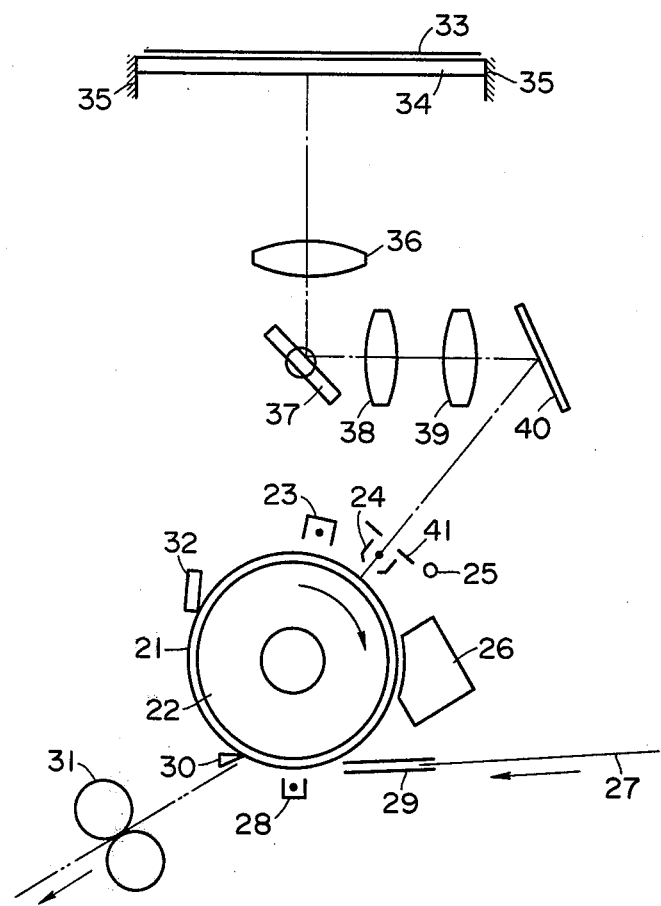
FIG. 13 is one embodiment of a reproduction apparatus, in which the projecting device according to the present invention is used.

FIG. 13 is a schematic diagram of one embodiment of the reproduction apparatus, to which the image projecting device according to the present invention is applied. As shown in the drawing, a drum 22 having on its peripheral surface a photosensitive body 21, which is essentially of a three-layered structure consisting of a substrate (a photoconductive body or an insulative body), a photoconductive layer provided on the substrate, and an insulative layer coated on the photoconductive layer is held at a fixed position in the reproduction apparatus, and rotated at a constant speed in an arrowed direction by an electric motor (not shown). The rotational speed of the drum 22 is the same for all reproduction magnifications. The surface of the photo-sensitive body 21 is first uniformly charged by a d.c. corona discharger 23. Next, the photosensitive body 21 is subjected to slit-exposure of a light image of an image original to be reproduced by an optical system to be described later, and, at the same time, subjected to corona discharge by a d.c. corona discharger 24 in a.c., or in a polarity opposite to that of the discharger 23. The corona discharger 24 is formed therein with a slit-opening that permits passage of image forming light beam. The photo-sensitive body 21 is subsequently uniformly illuminated on its overall surface by a lamp 25, whereby an electrostatic latent image in high image contrast can be formed from the image original. This latent image is developed by feeding of toner to the photo-sensitive body from a developer 26 such as a magnet brush or other types. The thus obtained visible toner image is then transferred onto image transfer paper 27 fed into the image transfer position at the same speed as the circumferential speed of the drum 22, while it is being subjected to discharge in the opposite polarity to the charge of the toner on its rear surface by a corona discharger 28 so as to augment its image transfer efficiency. The image transfer paper is taken out of a paper cassette (not shown), sheet by sheet, in synchronism with rotation of the drum, is brought into contact with the photo-sensitive body 21 through a guide 29, and, thereafter, is separated from the photo-sensitive body by a pawl 30. The conveying mechanism of the image transfer paper is well known. The toner image carried on the image transfer paper 27 is fixed by an image fixing device 31 such as heating rollers, and so on. On the other hand, the residual toner on the surface of the photo-sensitive body 21 after completion of the image transfer operation is removed by a cleaning device 32 such as rubber blade, etc., which is press-contacted to the photosensitive body, and the thus cleaned photosensitive body 21 is further used for the subsequent image forming process.

An image original to be reproduced is placed stationarily on a transparent, flat image original table 34. The image original table 33 is fixed to an unmovable member 35 of the reproduction apparatus main body such as a side plate, etc., and cannot be moved any way. A reference numeral 36 designates a rotationally symmetrical first image forming lens system which is provided in such a manner that one of its focal planes meets the surface of the original image table 34; 37 a rotary reflecting mirror, 38 an anamorphic, variable magnification lens group to correct any variation in the image forming magnification in one direction; and 39 refers to a rotationally symmetrical type variable magnification second image forming lens group, one of the focal planes of which is provided to meet the surface of the photosensitive body 21, and the image forming magnification of which varies in synchronism with rotation of the rotary reflecting mirror 37. A reference numeral 40 designates a fixed reflecting mirror; and 41 a slit, the opening of which corresponds to an opening width to be projected onto the surface of the image original 33 by the abovementioned image forming optical system (40, 39, 38, 37 and 36), whereby the image original 33 is subjected to the slit-scanning. As the result of this, the slit-shaped image on the surface of the image original 33 is focussed on the rotating drum 22 without distortion, and the original image is formed on the photosensitive drum 22 being free from distortion along with rotation of the rotary reflecting mirror. In this way, the scanning system by mirror rotation enables the high speed reproduction to be realized.

As stated in the foregoing, the image projecting device of the present invention projects the first plane onto the second plane without distortion by arranging two rotationally symmetrical image forming optical systems with a rotary light deflector being interposed therebetween, further providing at least one anamorphic image forming optical system, arranging the above-mentioned image forming optical systems in a manner to deflect parallel light beam with the deflector, and correcting the image forming magnification using at least one of the rotationally symmetrical image forming optical system and the anamorphic image forming optical system. Hence, it provides a very remarkable operational effect.

What we claim is:
1. An optical system for reproduction, comprising:
   (a) a rotationally symmetrical first image forming optical system;
   (b) a flat image original plane disposed on one focal plane of said first image forming optical system for subjection to slit-scanning;
   (c) a deflector to deflect in a predetermined direction a light beam from said image original plane and which passes through said first image forming optical system, said deflector performing its deflecting function by a deflecting and reflecting surface which rotates about a predetermined axis;
(d) a second image forming optical system to collect the light beam from said deflector;
(e) a photosensitive medium disposed at a position where the light beam is collected by said second image forming optical system; and
(f) an anamorphic optical system interposed between said image original plane and the photosensitive drum, and provided with means for making the image forming magnification the same in both the scanning direction and the direction orthogonal thereto, said first image forming optical system including means for maintaining constant the image forming magnification which would otherwise change with the change in rotational angle of said deflector.

2. The optical system according to claim 1, wherein said photo-sensitive medium is of a three-layer structure consisting of a substrate, a photo-conductive layer on said substrate, and an insulative layer coated on said photoconductive layer.

3. A scanning and projecting device, comprising:
(a) a rotationally symmetrical first image forming optical system;
(b) a flat scanning surface disposed on one focal plane of said first image forming optical system for subjection to slit-scanning;
(c) a deflector having a rotary reflecting surface for deflecting a light beam emitted from the scanning surface and rendered parallel by said first image forming optical system;
(d) a rotationally symmetrical second image forming optical system which receives the light beam deflected by said deflector;
(e) a light receiving surface disposed at a position where the light beam from said deflector is focussed by said second image forming optical system; and
(f) an anamorphic optical system interposed between said scanning surface and said light receiving surface, said anamorphic optical system including means for making the image forming magnification the same in both the scanning direction and the direction orthogonal thereto, and said first image forming optical system including means for maintaining constant the image forming magnification which would otherwise change with the change in rotational angle of the deflector.

4. The scanning and projecting device according to claim 3, wherein said first image forming optical system consists of a plurality of lenses, at least two of which move in accordance with the deflecting function of said deflector.

5. The scanning and projecting device according to claim 4, wherein said anamorphic optical system is interposed between the deflector and the light receiving surface, and at least two lenses out of a plurality of lenses constituting said anamorphic optical system move in accordance with the deflecting function of said deflector.

6. The scanning and projecting device according to claim 4, wherein said anamorphic optical system is a fixed lens group interposed between the scanning surface and the deflector.

7. A scanning and projecting device, comprising:
(a) a rotationally symmetrical first image forming optical system;
(b) a flat scanning surface disposed on one focal plane of said first image forming optical system for subjection to slit-scanning;
(c) a deflector having a rotary reflecting surface, said deflector deflecting a light beam emitted from the scanning surface and rendered parallel by said first image forming optical system;
(d) a rotationally symmetrical second image forming optical system which receives the light beam deflected by said deflector;
(e) a light receiving surface disposed at a position where the light beam from said deflector is focussed by said second image forming optical system; and
(f) an anamorphic optical system interposed between said scanning surface and said light receiving surface said anamorphic optical system including means for making the image forming magnification the same in both the scanning direction and the direction orthogonal thereto, and said second image forming optical system including means for maintaining constant the image forming magnification which would otherwise change with the change in rotational angle of the deflector.

8. The scanning and projecting device according to claim 7, wherein said second image forming optical system consists of a plurality of lenses, at least two of which move in accordance with the deflecting function of said deflector.

9. The scanning and projecting device according to claim 8, wherein said anamorphic optical system is interposed between the deflector and the light receiving surface, and at least two lenses out of a plurality of lenses constituting said anamorphic optical system move in accordance with the deflecting function of said deflector.

10. The scanning and projecting device according to claim 8, wherein said anamorphic optical system is a fixed lens group interposed between the scanning surface and the deflector.

11. An optical system for reproduction, comprising:
(a) a rotationally symmetrical first image forming optical system;
(b) a flat image original plane disposed on one focal plane of said first image forming optical system for subjection to slit-scanning;
(c) a deflector to deflect in a predetermined direction a light beam from said image original plane and which passes through said first image forming optical system, said deflector performing its deflecting function by a deflecting and reflecting surface which rotates about a predetermined axis;
(d) a second image forming optical system to collect the light beam from said deflector;
(e) a photosensitive medium disposed at a position where the light beam is collected by said second image forming optical system; and
(f) an anamorphic optical system interposed between said image original plane and the photosensitive drum, and provided with means for making the image forming magnification the same in both the scanning direction and the direction orthogonal thereto, and said second image forming optical system including means for maintaining constant the image forming magnification which would otherwise change with the change in rotational angle of the deflector.

12. The optical system according to claim 11, wherein said photosensitive medium is of a three-layer structure, consisting of a substrate, a photoconductive layer on said substrate, and an insulative layer coated on said photoconductive layer.

* * * * *

UNITED STATES PATENT OFFICE
CERTIFICATE OF CORRECTION

Patent No. 4,298,271      Dated November 3, 1981

Inventor(s) MUNEHARU SUGIURA, ET AL.

It is certified that error appears in the above-identified patent and that said Letters Patent are hereby corrected as shown below:

Column 11, line 25 (Table 4, under "m", 4th entry), change " -1.202" to -- -1.020--.

Column 13, line 7, " $+ \frac{V}{4} (\tan\theta)^4$ " should read --$+ \frac{\hat{V}}{4} (\tan\theta)^4$--.

Column 13, line 27, "$\hat{V} = -\frac{1}{3}, V = 7/3$" should read

--$V = -\frac{1}{3}, \hat{V} = 7/3$.--.

Signed and Sealed this

*Thirtieth* Day of *March 1982*

[SEAL]

Attest:

GERALD J. MOSSINGHOFF

*Attesting Officer*          *Commissioner of Patents and Trademarks*